United States Patent [19]
Zelt

[11] 4,323,804
[45] Apr. 6, 1982

[54] PERMANENT MAGNET FIELD MOTOR WITH RADIO FREQUENCY INTERFERENCE SUPPRESSING CAPACITOR

[75] Inventor: Edward J. Zelt, St. Marys, Pa.

[73] Assignee: The Stackpole Corporation, St. Marys, Pa.

[21] Appl. No.: 168,071

[22] Filed: Jul. 14, 1980

[51] Int. Cl.³ ............................................. H02K 11/00
[52] U.S. Cl. ...................................... 310/72; 310/220; 310/154
[58] Field of Search ........ 310/72, 68 R, 154, 220–225

[56] References Cited

U.S. PATENT DOCUMENTS

| | | | |
|---|---|---|---|
| 2,032,129 | 2/1936 | Jackson et al. | 310/72 |
| 2,048,096 | 7/1936 | Bisley | 310/72 X |
| 2,088,949 | 8/1937 | Fekete | 310/68 R X |
| 2,114,102 | 4/1938 | Collins | 310/72 |
| 3,090,877 | 5/1963 | Baumhart | 310/154 |
| 3,373,301 | 3/1968 | Black | 310/72 |
| 4,136,294 | 1/1979 | Aubert et al. | 310/220 |
| 4,211,944 | 9/1980 | Haller | 310/72 |

FOREIGN PATENT DOCUMENTS 864093  4/1941  France .................................. 310/72

*Primary Examiner*—Donovan F. Duggan
*Attorney, Agent, or Firm*—Brown, Flick & Peckham

[57] ABSTRACT

The permanent magnet fields encircling the armature of a direct current motor are encircled by a pair of radially spaced cylindrical metal members separated by a cylindrical dielectric member. One of the metal members and one of the brushes that engages the commutator of the motor are grounded. The other brush and the other cylindrical metal member are connected to a direct current power supply, whereby a capacitor is formed by the three cylindrical members for suppressing radio frequency noise generated by sparking of the brushes at the commutator.

9 Claims, 7 Drawing Figures

PERMANENT MAGNET FIELD MOTOR WITH RADIO FREQUENCY INTERFERENCE SUPPRESSING CAPACITOR

In a direct current permanent magnet field motor there is sparking where the brushes engage the commutator. This sparking generates radio frequency noise that is conducted out of the motor to the direct current power source and causes interference with any electronic device in the same circuit or in the vicinity of the motor if not properly shielded. It is known that ferrite beads or choke coils in series with the motor, or capacitors connected across the motor, act as radio frequency interference filters. However, it is expensive to buy capacitors and they are difficult and costly to install in the motors.

It is among the objects of this invention to provide a direct current permanent magnet field motor which eliminates the necessity for purchasing pre-made capacitors to suppress radio frequency interference, which simplifies the installation of a capacitor, which produces RFI suppression on the CB and FM bands, and with which it is easy to install a fusible link as a safety feature to open the capacitor circuit in case the capacitor becomes shorted. Another object is to use part of the motor itself to form a plate of a capacitor.

The preferred embodiment of the invention is illustrated in the accompanying drawings, in which FIG. 1 is a side view, partly broken away in vertical section, of a permanent magnet field motor;

Figure 1:
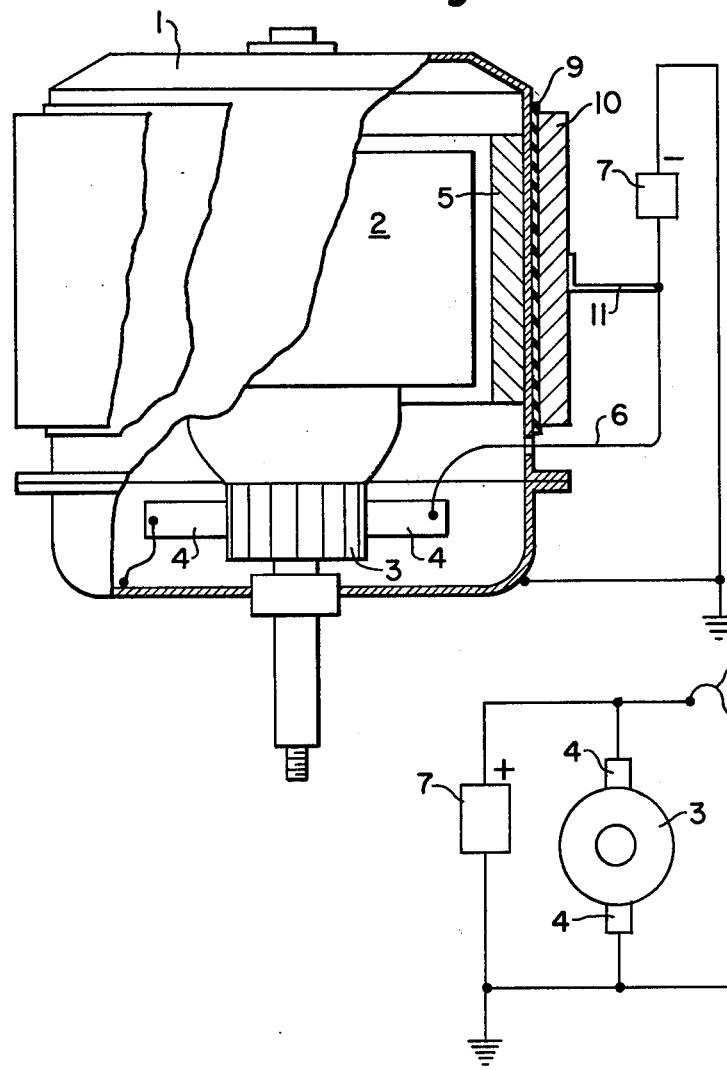
Figure 2:
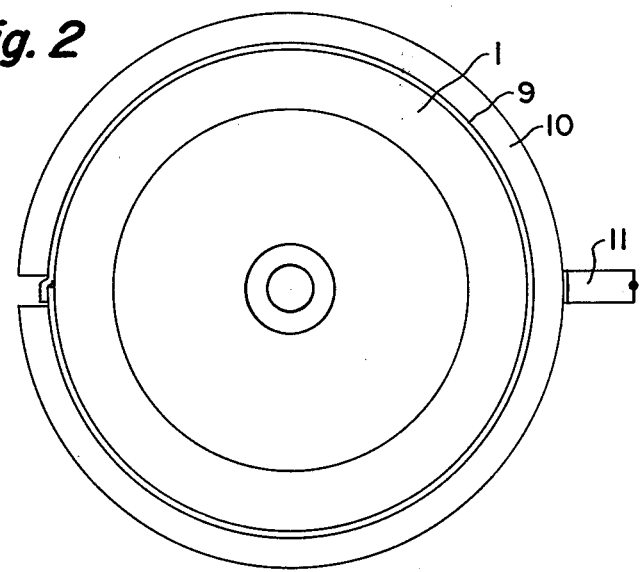
FIG. 2 is a plan view of the motor.

Referring to FIGS. 1 and 2 of the drawings, an electric motor is shown which has a metal case 1, in which an armature 2 is rotatably mounted on a vertical axis. At its lower end the armature carries a commutator 3 engaged by a pair of brushes 4 in the usual manner. Encircling the armature are permanent magnet fields 5 secured to the side wall of the metal case. This side wall forms a substantially cylindrical member extending around the permanent magnet fields. One of the brushes is grounded to the metal case, which in turn is grounded. The other brush is connected by a wire 6 extending out of the case to one pole of a DC power supply 7 that operates the motor. The other pole of the power supply is connected to ground. The power supply may be either a battery or rectified power from an AC line.

While the motor is operating there is sparking between the brushes and the commutator. This sparking, if not suppressed, will produce radio frequency noise that is conducted out through the power lead 6 to the power supply and can cause interference, if not properly shielded, with any electronic device in the same circuit or in the vicinity of the motor, as AM/FM radios, CB transceivers, computers, amateur radios, etc. If a filtering device is properly applied to the motor, it can prevent radio frequency noise from causing this interference. It is known that capacitors placed across the motor will act as radio frequency interference filters.

It is a feature of this invention that a capacitor is provided which is not a separate element that must be added to the circuit, but is a part of the motor itself. To form such a capacitor, a substantially cylindrical dielectric member 9 encircles the case in engagement with it and in turn is encircled by a substantially cylindrical metal member 10 in the form of a flux-return ring, which is connected by a current-conducting element 11 with the same side of the power supply to which brush wire 6 is attached. The result is that what amounts to a two plate capacitor is formed, one plate being the side wall of the case and the other plate being the flux-return ring 10. The latter preferably is split transversely as shown in FIG. 2 so that the ends can be spread apart slightly to permit the ring to be slipped over the dielectric member 9, which it will grip tightly with spring pressure when released. The dielectric can be any material used for making capacitors, such as paper, Mylar, polystyrene, Teflon, polysulfone, ceramic, etc. Also, the dielectric can be in the form of a film wound around the case or it can be material applied to the outer surface of the case or to the inner surface of ring 10 by fluidized bed process, dipping, spraying, wiping, brushing, rolling, etc. Flux-return ring 10 can be insulated by an insulating paint or by an insulating sleeve slipped over it.

With such a motor there is no necessity for acquiring separate expensive capacitors and trying to wire them into the circuit in order to suppress radio frequency interference. The amount of capacitance can be controlled by the type and thickness of the dielectric. It is necessary to remove all burrs and sharp edges along the ends of the flux-return ring 10 to prevent them from cutting through the dielectric layer and shorting out the capacitor.

Preferably, the conducting element 11 connecting the ring 10 with the power supply is a fusible link so that if a short circuit occurs in the capacitor the link will burn open the circuit to the capacitor, which will immediately be cut out of the circuit, but the operation of the motor will not be affected. If this happens, the radio frequency noise will increase and be a signal that the capacitor is no longer performing its intended function. This removal of the capacitor from the circuit is an important and necessary safety feature for automotive application such as windshield wiper and defroster motors. The safety fusible link 11 outside of the motor is easy to install, inspect and repair in trouble shooting a defective motor or capacitor. For best performance, the fusible link should be attached to the ring 10 at approximately the midway point between the ends of the split ring.

Figure 3:
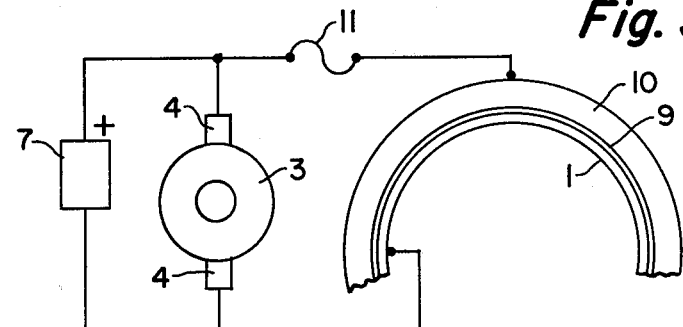
FIG. 3 is a schematic view of the motor and capacitor circuits.

For a better understanding of the invention, it is illustrated schematically in FIG. 3, where the different elements bear the same reference numbers as in FIGS. 1 and 2. This figure shows clearly that the capacitor is in parallel with the armature circuit, so that the latter is not affected if the capacitor is shorted and the fusible link 11 burns away.

Figure 4:
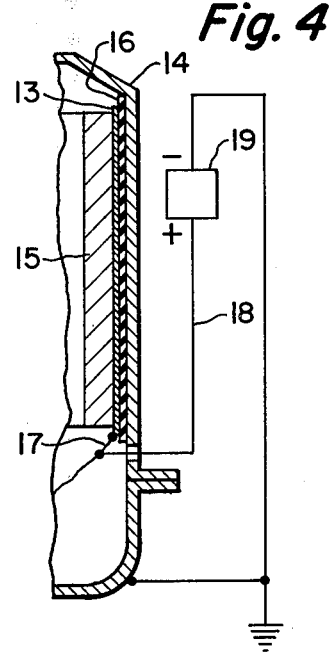
FIG. 4 is a fragmentary vertical section of a modification.

In the modification shown in FIG. 4, a plate 13 of a capacitor has been placed inside the motor case 14 between the permanent magnet fields 15 and the case, which serves as the other plate of the capacitor. The plate 13 may be formed by metal foil wrapped around the permanent magnet fields. A cylindrical dielectric member 16 seprates plate 13 from the inside of the case.

Plate 13 is connected by a conducting element 17 to the power input line 18 extending from the DC power supply 19 to one of the brushes, whereby a capacitor is formed for radio frequency noise suppression. Conducting element 17 preferably is a fusible safety link.

Figure 6:
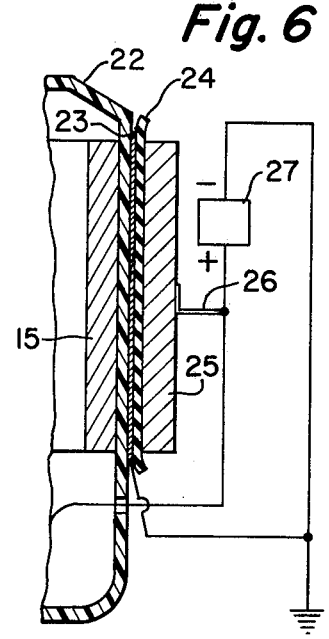
FIG. 6 is a fragmentary vertical section of a still further modification.

In a further embodiment of the invention shown in FIG. 6, the motor case 22 is made of a plastic, so in order to form the inner metal member or plate of the capacitor the plastic case is encircled by a substantially cylindrical metal member 23 in engagement with it. This member may be formed by wrapping metal foil around the case. A cylindrical dielectric member 24 separates metal member 23 from an encircling metal flux-return ring 25 formed like the one in FIG. 1. The inner metal cylinder 23 is grounded and the outer ring 25 is electrically connected, preferably by a fusible link 26, to a DC power supply 27. The three cylindrical members 23, 24 and 25 form a capacitor.

Figure 5:
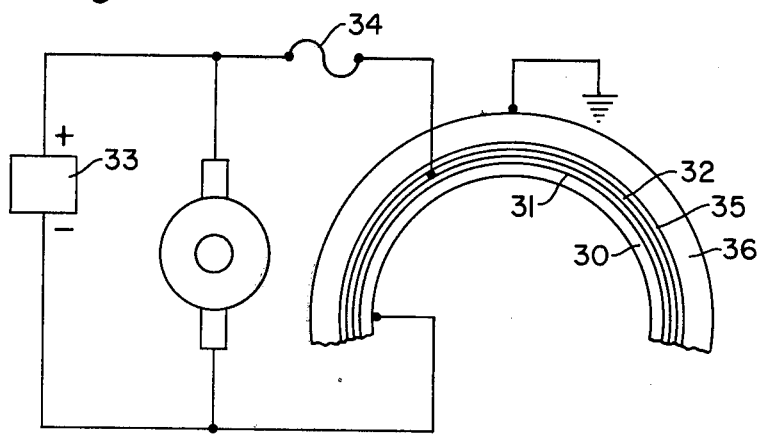
FIG. 5 is a schematic view of a further embodiment of the invention.

What amounts to a three plate capacitor is shown schematically in FIG. 5. In this example the motor has a metal case 30 like the one in FIG. 1, encircled by a dielectric member 31 that in turn is encircled by a metal ring 32 that may be formed by metal foil wrapped around the dielectric member. Ring 32 is electrically connected to a DC power supply 33, preferably through a fusible link 34, as in FIG. 1. However, ring 32 is encircled by a dielectric member 35, which in turn is encircled by split metal ring 36 that is grounded. The motor case and the outer ring 36 form, in effect, two plates of the capacitor while the middle metal ring 32 forms the third plate insulated from the other two metal cylinders by the two dielectric layers 31 and 35. The advantages of this form of the invention are that capacitance is increased for better filtering, and there is no need to insulate the outer ring 36 because there is no voltage on it.

Figure 7:
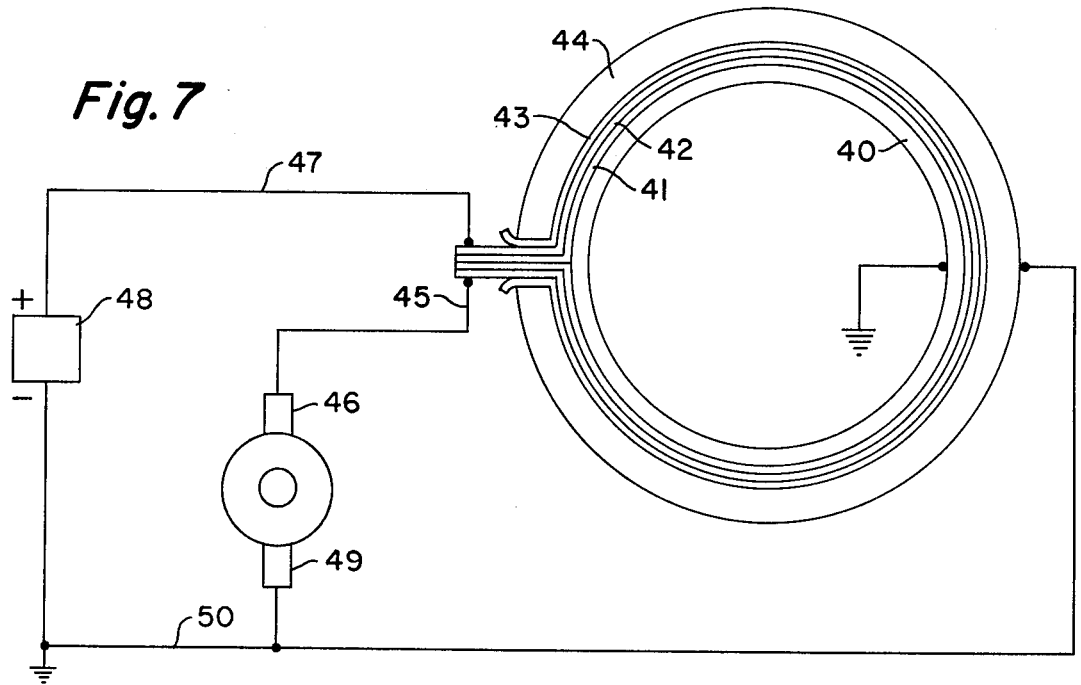
FIG. 7 is a schematic view of another modification.

In the modification illustrated by FIG. 7, the side wall 40 of a permanent magnet field motor case is encircled by a dielectric material 41, which in turn is encircled by a metal member 42 preferably in the form of metal foil wrapped around the dielectric. Encircling the foil is another layer of dielectric 43, which is encircled by a metal ring or cylinder 44. Both ends of the metal foil extend out through slots in dielectric 43 and the metal cylinder. One end of the foil is connected by a wire 45 to a brush 46 riding on the motor commutator, while the other end of the foil is connected by a wire 47 to one pole of a direct current power supply 48. The motor case and the outer ring are grounded, and the other brush 49 is connected by a wire 50 to the other pole of the power supply and to ground. With this construction, two concentric capacitors are formed, as well as a small valve inductance that forms a $\pi$ type filter for improving the RFI suppression even further.

The references herein to a pair of brushes or a pair of cylindrical members does not mean that there is a limit of only two, since three or more elements include a pair.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A direct current permanent magnet field motor comprising an armature, permanent magnet fields encircling the armature and spaced therefrom, a commutator connected to one end of the armature for rotation therewith, a pair of brushes engaging the commutator, a pair of radially spaced substantially cylindrical metal members encircling said permanent magnet fields, a substantially cylindrical dielectric member between the two metal members, means for grounding one of said metal members and one of the brushes, and means for electrically connecting the other brush and the other metal member with a direct current power supply, whereby a capacitor is formed by said pair of metal members and said dielectric member for suppressing radio frequency noise generated by sparking of the brushes at said commutator.

2. A motor according to claim 1, in which one of said cylindrical metal members is the side of a metal case enclosing said permanent magnet fields and armature.

3. A motor according to claim 2, in which it is said case that is grounded.

4. A motor according to claim 3, including a third substantially cylindrical metal member encircling said other cylindrical metal members, a substantially cylindrical dielectric member between said other metal member and third metal member, and means for grounding said third metal member.

5. A motor according to claim 2, in which it is said case that is grounded, and said other metal member and dielectric member encircle the outside of the case.

6. A motor according to claim 1, in which it is said case that is grounded, and said other metal member and dielectric member are mounted inside the case between it and said permanent magnet fields.

7. A motor according to claim 1, including a plastic case enclosing said permanent magnet fields and armature and disposed between them and said cylindrical members.

8. A motor according to claim 1, in which said last-mentioned means includes a wire for electrically connecting said other brush to said direct current power supply, and a fusible link for electrically connecting said other metal member with the direct current power supply whereby a short in the capacitor will not affect the operation of the motor.

9. A motor according to claim 1, in which the innermost cylindrical metal member is the case and it is grounded, said motor including a third substantially cylindrical metal member encircling said other cylindrical metal members, a substantially cylindrical dielectric member between said other metal members and third metal member, means electrically connecting said third metal member to said grounded brush, said other metal member being connected in series with said other brush and power supply.

* * * * *